(12) United States Patent
Goupil (10) Patent No.: US 9,348,933 B2
(45) Date of Patent: May 24, 2016

(54) INTER-FRAME COMMUNICATION OF OBJECTS

(71) Applicant: Microsoft Technology Licensing, LLC, Redmond, WA (US)

(72) Inventor: Jean-Sébastien Goupil, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 13/801,915

(22) Filed: Mar. 13, 2013

(65) Prior Publication Data

US 2014/0281885 A1  Sep. 18, 2014

(51) Int. Cl.
*G06F 17/00* (2006.01)
*G06F 17/30* (2006.01)
*G06F 17/22* (2006.01)

(52) U.S. Cl.
CPC ........ *G06F 17/3089* (2013.01); *G06F 17/2247* (2013.01)

(58) Field of Classification Search
CPC .................................................. G06F 17/2247
See application file for complete search history.

(56) References Cited

U.S. PATENT DOCUMENTS

| | | | | |
|---|---|---|---|---|
| 6,094,684 A * | 7/2000 | Pallmann | ................ | G06F 9/54 709/227 |
| 6,549,949 B1 * | 4/2003 | Bowman-Amuah | .... | H04L 69/06 709/236 |
| 6,753,886 B1 * | 6/2004 | Schuft | .................... | G06F 9/542 715/764 |
| 8,209,706 B2 | 6/2012 | Corvera et al. | | |
| 8,214,515 B2 * | 7/2012 | Lee | ........................ | A63F 13/12 709/230 |
| 8,341,239 B2 | 12/2012 | Hao et al. | | |

OTHER PUBLICATIONS

Flanagan, "JavaScript: The Definitive Guide" 6th Edition, published May 3, 2011, excerpts of Chapter 18, p. 1-33.*
"JSON—Yui Library", captured by Internet Archive Wayback Machine from http://yuilibrary.com/yui/docs/json/ on Sep. 29, 2011, p. 1-5.*
"Websockets everywhere with Socket.IO", retrieved from http://howtonode.org/websockets-socketio, released Sep. 29, 2010, p. 1-8.*

(Continued)

*Primary Examiner* — Amelia Tapp
(74) *Attorney, Agent, or Firm* — Ben Tabor; Fehmi Chebil; Micky Minhas (57) ABSTRACT

Inter-frame communication of an object of a type is not directly supported by a receiving module of the target frame. Instead, the source object is restructured to be a particular transport-compatible type that is supported by the receiving module of the target frame. The restructured object also has encoded therein source type information correlated to the particular source type of the object. The sending module of the source frame then converts the object into data of a particular transport type, such as a string, for transporting the data to the receiving module of the target frame. The receiving module may then recover the object of the particular transport-compatible type. The target frame may then decode the source type information from the recovered object, and use that source type information to obtain an object that has at least some of the semantic structure of the source object.

20 Claims, 3 Drawing Sheets

(56) References Cited

OTHER PUBLICATIONS

Prototype JavaScript framework: Introduction to JSON, last updated on Mar. 11, 2007, 3 pages, retrieved from http://web.archive.org/web/20070312004110/http://www.prototypejs.org/learn/json.*

PHP Manual, JSON Functions: json_decode, captured by Internet Achive Wayback Machine on Feb. 11, 2012, retrieved from http://web.archive.org/web/20120211195948/http://www.php.net/manual/en/function.json-decode.php, p. 1-23.*

EasyXDM, retrieved from Internet Archive Wayback machine captures in Feb. 2012, p. 1-8.*

NonBlocking.io—Malte Ubl's Asynchronous Identity Disorder, "Access to WebSockets on a Sub-Domain though a Proxy iFrame", Oct. 12, 2010, p. 1-2.*

Mickens, et al., "Jigsaw: Efficient, Low-effort Mashup Isolation", In Proceedings of 3rd USENIX Conference on Web Application Development, Jun. 13, 2012, 13 pages.

"Cross Domain API Using postMessage—Displaying UI and Returning Data", Published on: Oct. 26, 2012, Available at: http://codeclosure.wordpress.com/category/cross-domain-2/, 11 pages.

Luo, et al., "Mashic Compiler: Mashup Sandboxing based on Interframe Communication", In Proceeding of IEEE 25th Computer Security Foundations Symposium, Jun. 25, 2012, 14 pages.

Wu, et al., "Toward an OpenSocial Life Science Gateway", In Grid Computing Environments Workshop, Nov. 2008, 7 pages.

Auberger, Georges, "Secure Cross Domain iFrame Communication", Published on: Mar. 27, 2011, Available at: http://ternarylabs.com/2011/03/27/secure-cross-domain-iframe-communication/, 7 pages.

* cited by examiner

INTER-FRAME COMMUNICATION OF OBJECTS

BACKGROUND

A browser is capable of rendering a browser window (such as a web page) in response to receiving markup language and associated files, such as graphics, video, and executable files. A browser window often includes multiple frames, where each frame might display some content that may be populated independent of the remainder of the frames in the browser window. Typically, the frames are hierarchically structured such that the root frame is the entire scope of the browser window itself. The browser window may include one or more frames that represent children frames of the root frame. Those children frames may have their own children frames contained within their respective boundaries, and so forth.

Often, it is possible for the frames of a single browser window to be included within different security domains. For example, perhaps all but one frame is controlled by the publisher of the browser window, but that publisher allows a third party to publish content within one of the frames. In that case, the third-party frame may be in a different security domain than the remainder of the frames. Frames within one domain cannot easily communicate with frames in another domain, except through a controlled interface. This restriction provides security to the communication process, but the controlled interface only supports communication of a limited number of data types. For instance, strings, arrays, Boolean values, simple objects, and integers might be communicated over the controlled interface, but not more complex objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the communication of an object between frames. Such communication is possible even though the object is of a type that is not directly supported by a receiving module of the target frame that receives the object. Upon detecting that a source object of a particular source type is to be sent from the source frame, the source object is restructured to be a particular transport-compatible type that is supported by the receiving module of the target frame. The restructured object also has encoded therein source type information correlated to the particular source type of the object. The sending module of the source frame then converts the object into data of a particular transport type, such as a string, for transporting the data to the receiving module of the target frame.

The receiving module may then recover the object of the particular transport-compatible type. The target frame then decodes the source type information from the recovered object, and uses that source type information to obtain an object that has at least some of the semantic structure of the source object. As examples only, the source object may be a date, function, or a function call on an identified method.

The principles described herein also permit for correlation when there are correlated communications by using a unique identifier for the message sequence. For instance, there might be a first communication from the source frame to the target frame, and a second communication from the target frame to the source frame, that are each correlated.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the communication of an object between frames. Such communication is possible even though the object is of a type that is not directly supported by a receiving module of the target frame that receives the object. Upon detecting that a source object of a particular source type is to be sent from the source frame, the source object is restructured to be a particular transport-compatible type that is supported by the receiving module of the target frame. The restructured object also has encoded therein source type information correlated to the particular source type of the object. The sending module of the source frame then converts the object into data of a particular transport type, such as a string, for transporting the data to the receiving module of the target frame.

The receiving module may then recover the object of the particular transport-compatible type. The target frame then decodes the source type information from the recovered object, and uses that source type information to obtain an object that has at least some of the semantic structure of the source object. Hereinafter, the mechanism for communicating from a first frame to a second frame may also be referred to as "cross-frame extended object messaging". As examples only, the source object may be a date, function, or an identified function call.

The principles described herein also permit for correlation when there are correlated communications by using a unique identifier for the message sequence. For instance, there might be a first communication from the source frame to the target frame, and a second communication from the target frame to the source frame, that are each correlated.

As a first example, the source frame might assign a unique identifier to a function when communicating a function as a source object to the target frame using cross-frame extended object messaging. That unique identifier might also be used to correlate a function call when the target frame communicates a function call as the source object back to the source frame using cross-frame extended messaging.

As a second example, the source frame might assign a unique identifier to a function call to a specific method when communicating a function call as a source object to the target frame using cross-frame extended object messaging. A name of the method to be called, as well as potentially any input arguments, may also be encoded into the data of the particular transport type for communication to the target frame. That unique identifier might also be used to correlate a return communication when the target frame returns the return communication as the source object back to the source frame using cross-frame extended messaging. One or more return arguments might also be encoded into the data of the particular transport type for communication to the source frame.

Some introductory discussion of a computing system will be described with respect to FIG. 1. Then, the principles of cross-frame communication will be described with respect to FIGS. 2 and 3.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
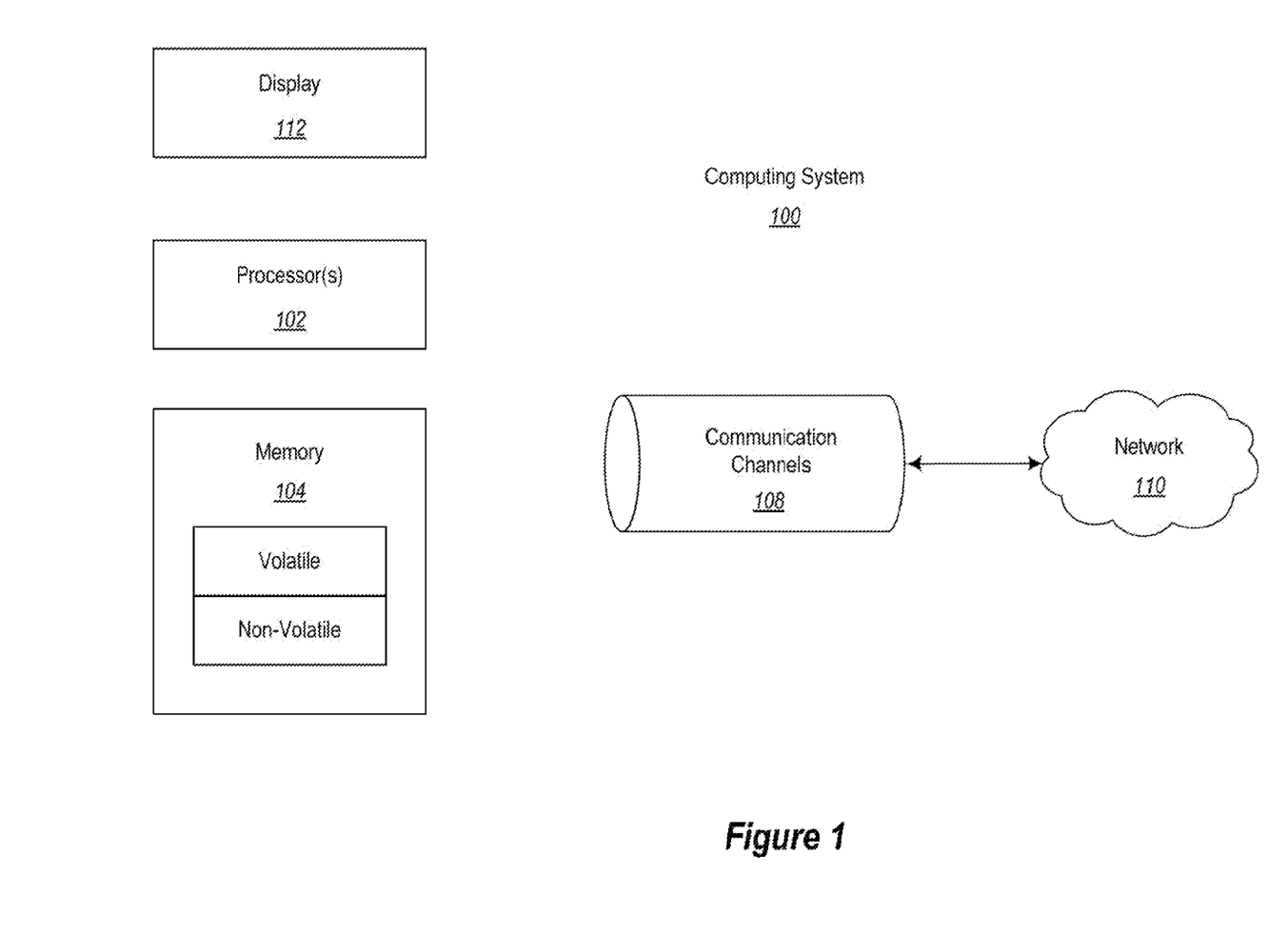
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible and/or physical medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
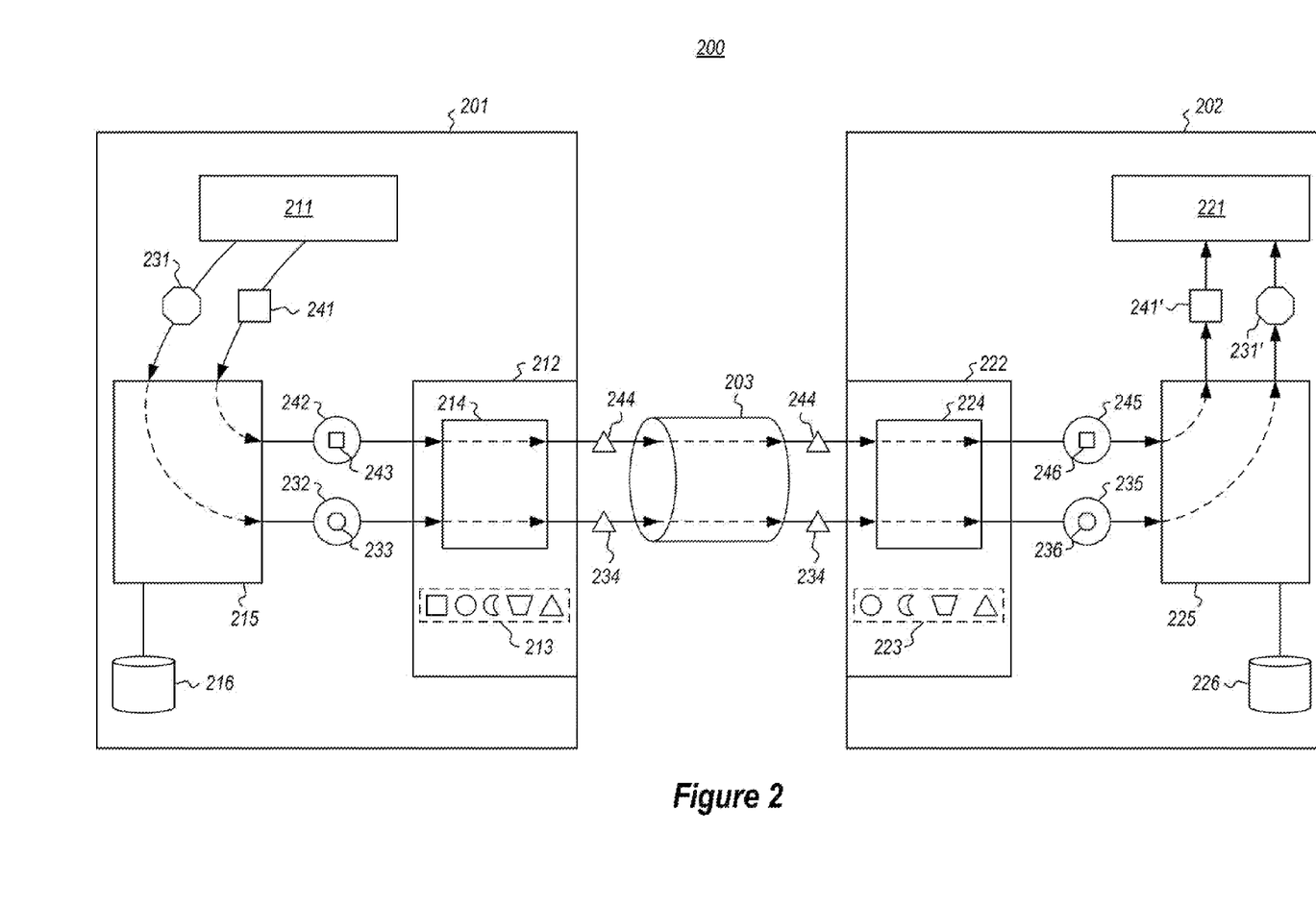
FIG. 2 illustrates a system in which there are two frames communicating complex objects one with another.

FIG. 2 illustrates a system 200 in which there are two frames 201 and 202. Each frame includes logic that allows the frame to coordinate with a browser (not shown) so that the browser may visualize a corresponding window on the browser user interface. That browser may then render the user interface on a display such as display 112 of FIG. 1. For instance, the system 200, or components thereof, may be instantiated and/or operated, in response to the processor(s) 102 of the computing system 100 executing computer-executable instructions that are embodied on computer-readable storage media or devices.

Referring to FIG. 2, frame 201 includes logic 211 and frame 202 includes logic 221. A web page is typically constructed of a hierarchical structure of one of more frames. A root frame might be, for instance, an entire web page. Children frames might, for instance, occupy only some of the space encompassed by their parent frame. In one embodiment, the frames 201 and 202 may be HyperText Markup Language iFrame elements.

The frames 201 and 202 may communicate using an inter-frame communication channel 203. However, the inter-frame communication channel 203 communicates data of a particular transport type. In conventional inter-frame communication (such as, for example, using JAVASCRIPT® Object Notation or "JSON", for short), the particular transport type is a string. However, the principles described herein may operate for any data serialization format used between frames of a browser window, whether such data serialization formats now exist, or whether they are yet to be developed. Furthermore, the principles described herein may operate for any data serialization format regardless of the particular transport type (e.g., binary, string, and so forth) that the data serialization format uses.

In FIG. 2, the particular transport format used in the inter-frame communication channel 203 is abstractly represented as a triangle. More generally, throughout the figures, different object types are abstractly represented as different shapes.

In the example, of FIG. 2, the frame 201 has logic 211 that sends two objects 231 and 241 to the logic 221 of the frame 202. Thus, with reference to FIG. 2, the frame 201 will also be referred to herein as a "source frame", and the frame 202 will also be referred to herein as a "target frame".

The object 231 is represented as an octagon, which abstractly represents a type of the object 231. The object 241 is represented as a square, which abstractly represents a type of the object 241. Note that the objects 231 and 241 are not of the same type as each other, as they are different shapes. Furthermore, the objects 231 and 241 are not of the particular transport type (i.e., a triangle), since the objects 231 and 241 are not represented as triangles.

Object 231' (corresponding to object 231) is received at the logic 221 of the target frame 202. The object 231' as received by the target logic 221 of the target frame 202 may indeed be exactly of the same type as the object 231 as sent by the source logic 211 of the source frame 201. However, this need not be the case. The received object 231' "corresponds to" the sent object 231 in the sense that the received object 231' includes at least some of the semantic structure of the sent object 231. Likewise, received object 241' corresponds to sent object 241.

The source frame 201 includes a sending module 212 that is configured to use conversion logic 214 to convert objects of any one of a set of transport-compatible types 213 into data of the particular transport type. For instance, the sending module 212 is configured to convert objects of any one of five different types 213 (abstractly represented from left to right as a square, a circle, a crescent, a parallelogram and a triangle). The types 213 are "transport-compatible" in the sense that the sending module 212 is capable of converting objects of that type into a transport type suitable for transmission.

In current technology, the JSON.stringify method may be used as the sending component 212, although the principles described herein are not limited to the component that converts from multiple transport-compatible types into a transport type. The JSON.stringify method includes at least the following transport-compatible types: dates, strings, numbers, Boolean values, "simple objects" (i.e., a set of one or more key-value pairs in which each value may be also be any transport-compatible type) and arrays. The JSON.stringify method converts objects of such types into a string for transport to the target frame.

The target frame 202 includes a receiving module 222 that is configured to use conversion logic 224 to convert data of the particular transport type into any one of a set of transport-compatible types 223, depending on the structure of the data. For instance, the receiving module 222 is configured to convert received data to any one of four different types 223 (abstractly represented from left to right as a circle, a crescent, a parallelogram and a triangle), depending on the structure of the data within the transport type. The types 223 are "transport-compatible" in the sense that the receiving module is capable of converting them from the transport type into one of the transport-compatible types.

In current technology, the JSON.parse method may be used as the receiving component 222, although the principles described herein are not limited to the component that converts from the transport type into one of the multiple transport-compatible types. The JSON.parse method includes at least the following transport-compatible types: strings, numbers, Boolean values, and simple objects and arrays. The JSON.parse method is passed the data represented in string format, and converts objects of such types into the appropriate object type.

Note that the transport-compatible types 213 of the sending module 212 are not entirely the same as the transport-compatible types 223 of the receiving module 222. For instance, there is a square object type in transport-compatible types 213, but not in transport-compatible types 223. Thus, the sending module 212 is capable of converting an object of a particular type abstracting represented by a square into data of the transport type (abstractly represented by a triangle). However, the receiving module 222 is not capable of converting the data of the transport type back into the object of the particular type. As a real example, JSON.stringify can convert dates into strings, but JSON.parse cannot convert strings back into dates.

Figure 3:
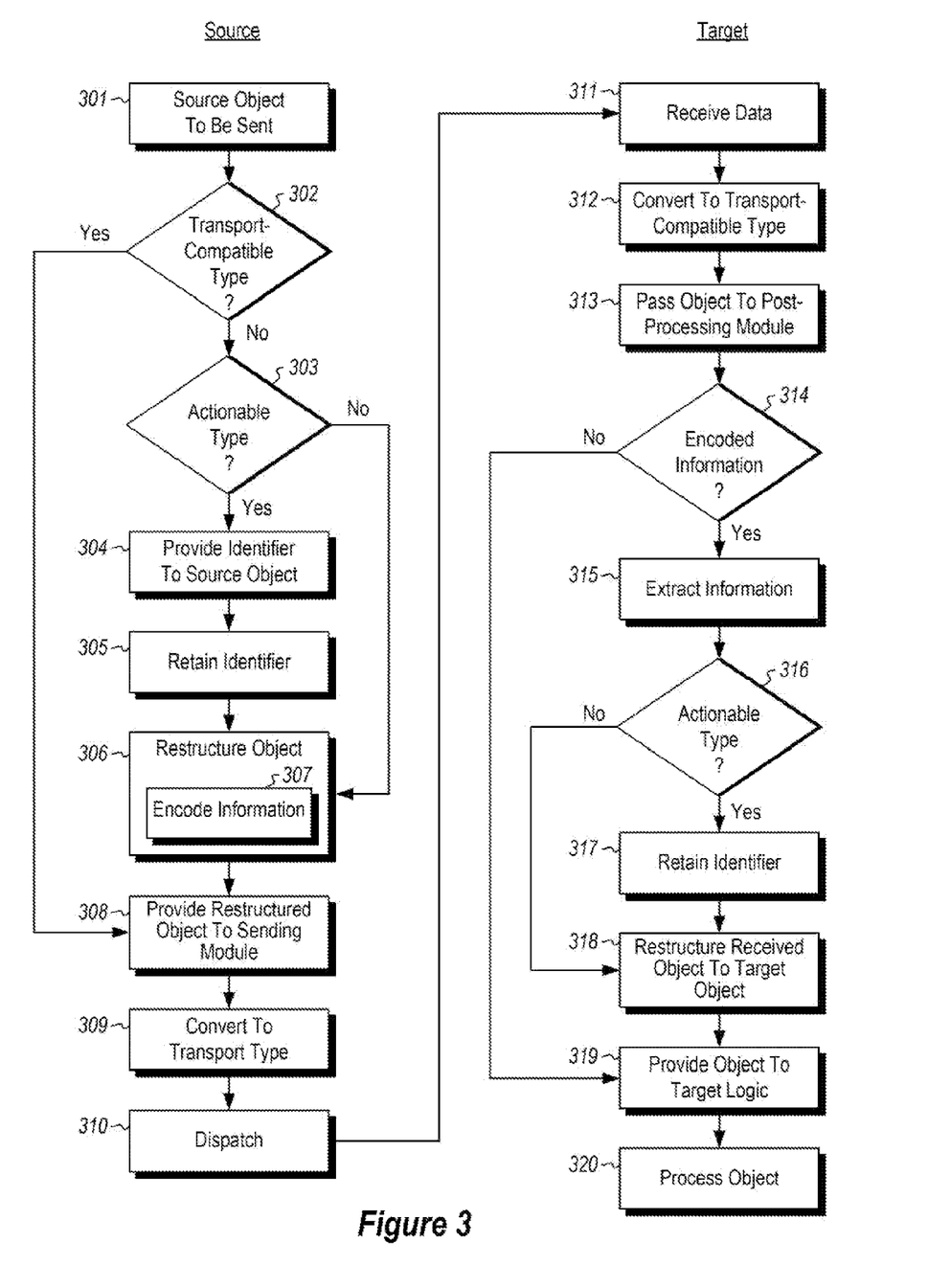
FIG. 3 illustrates a flowchart of a method for communicating an object between frames.

FIG. 3 illustrates a flowchart of a method 300 for communicating an object between frames. As the method 300 may be performed in the environment 200 of FIG. 2, the method 300 will now be described with frequent reference to FIGS. 2 and 3. Those acts that are performed at the source frame (e.g., source frame 201) are listed in the left column of FIG. 3 under the header "Source". Those acts that are performed at the target frame (e.g., target frame 202) are listed in the right column of FIG. 3 under the header "Target".

The method is initiated upon detecting that a source object of a particular source type is to be sent from a source frame (act 301). For instance, in FIG. 2, a pre-processing component 215 receives the source object 231 from the source logic 211, with an expressed or implied instruction that the source object 231 is to be communicated to the target frame 202. As another example, the pre-processing component 215 receives the source object 241 from the source logic 211, thus causing the method 300 to be performed separately with respect to each of the objects 231 and 241. In one embodiment, the source frame queues such transmissions such that the method 300 is performed only on one object at a time. Thus, the sending objects in the queue might be deferred until an acknowledgement is received from the target object that the target object has been received and/or processed. When that acknowledgement is received, the next object in the queue may be sent, and so on. This queuing thus preserves functional dependencies in the execution of the frames.

Upon determining that the source object is to be sent (act 301), it is then determined whether the type of the source object is one of the transport-compatible types that the receiving module is capable of converting received data into (decision block 302). If the source object is one of the transport-compatible types that the receiving module is capable of converting received data into ("Yes" in decision block 302), then the source object is provided to the sending module (act 308). For instance, in FIG. 2, any objects of the circle, crescent, parallelogram, or triangle would be forwarded directly to the sending module 212, rather than being further processed by the pre-processing module 215.

If the source object is not one of the transport-compatible types that the receiving module is capable of converting received data into ("No" in decision block 302), then further pre-processing is performed. For instance, in FIG. 2, the source object 231 is of a type (abstractly represented by an octagon) that is not one of the transport-compatible types 223 that the receiving module 222 is capable of converting received data into ("No" in decision block 302). Likewise, the source object 241 is of a type (abstractly represented by square) that is not one of the transport-compatible types 223 that the receiving module 222 is capable of converting received data into (again "No" in decision block 302). Accordingly, the pre-processing component 215 would further pre-process the objects 231 and 241. Note that even though the source object 241 could be converted into the transport type by the sending module 212 (since the square is one of the transport-compatible types), further pre-processing is still performed since the since the receiving module 222 is not capable of converting back into objects of that type.

Again further pre-processing occurs when the source object type is not one of the transport-compatible types that the receiving module is capable of converting received data into ("No" in decision block 302). In that case, it is further determined whether the source object type is an actionable type (decision block 303). An "actionable" type is a type whose objects may be acted upon by the target frame with impact on the object at the source frame. Examples of actionable types include a function or a function call to a particular method.

If the type of the source object is an actionable type ("Yes" in decision block 303), then the source frame uniquely identifies the source object (act 304), and at least temporarily keeps the identity of the source object (act 305). For instance, in FIG. 2, the identity of the source object may be kept within store 216 in a manner that the identity is associated with the source object. The pre-processing component then restructures the source object to be of a particular transport-compatible type (act 306) that the receiving module is capable of converting received data into. If the source object is not an actionable type ("No" in decision block 303), then acts 304 and 305 are bypassed, and instead, the pre-processing component restructures the source object to be of the particular-transport compatible type (act 306) that the receiving module is capable of converting received data into.

For instance, in FIG. 2, the source object 231 of the octagon type is converted into a restructure object 232 of a circle type. The circle type is indeed one of the transport-compatible types 223 that the receiving module 222 is capable of converting received data into. As another example, the source object 241 of the square type is converted into a restructure object 242 of the circle type. However, the principles described herein are not limited to embodiments in which the pre-processing component converts objects into the same transport-compatible type.

As part of the restructuring of the source object (act 306), the pre-processing component also encodes information (act 307) into the restructured object. For instance, the encoded information includes source type information that correlates to the type of the source object. In the case of the source object being an actionable type, the encoded information might also include the identifier of the actionable object. For instance, if the actionable type were a function or a function call, the identifier of the function and the function call may be encoded within the restructured object. Further supplemental information may be encoded into the restructured object. For instance, if the source object were a function call, perhaps as set of one of more input arguments and a method name might also be encoded within the restructured object. Such encoded information may later be extracted by the post-processing component 225 of the target frame 202. In FIG. 2, the restructured objects 232 and 242 are each is illustrated as including information 233 and 243, which abstractly represents the respective encoded information that the pre-processing component 215 includes within the restructured objects.

The restructured object is then provided to the sending module (act 308), which converts the restructured object into data of the particular transport type (act 309) whereupon the data is dispatched to the target module (act 310). For instance, in FIG. 2, the restructured object 232 is provided to the conversion logic 214 of the sending module 212 to convert the restructured object 232 into data 234 of the particular transport type (abstractly represented by the triangle) suitable for transport through the inter-frame communication channel 203. Likewise, the restructured object 242 is provided to the conversion logic 214 of the sending module 212 to convert the restructured object 242 into data 244 of the particular transport type suitable for transport through the inter-frame communication channel 203. Note that the communication channel 203 need not be only a physical communication channel, but may include software components as well.

The receiving module of the target frame then receives the data of the particular transport type (act 311) from the inter-frame communication channel. In FIG. 2, for example, the conversion logic 224 of the receiving module 222 receives the data 234 (corresponding to the source object 231) and the data 244 (corresponding to the source object 241) from the inter-frame communication channel 203.

The receiving module then converts the data of the particular transport type into a received object of a particular transport-compatible type (act 312). This is performed in a manner that preserves the information encoded into the object in the pre-processing module (reference act 307). In this description and in the claims, "information" is to be interpreted broadly, not requiring that the information be preserved in a particular data structure or form.

In one embodiment, the receiving module 222 converts the object back into the same transport-compatible type in which the object was provided to the sending module 212. For instance, in FIG. 2, conversion module 224 of receiving module 222 converts the received data 234 into the received object 235, and converts the received data 244 into the received object 245. In this case, the received object 235 is of the same type as the restructured object 232, and the received object 245 is the same type as the restructured object 242. Furthermore, note that received object 235 includes information 236 which may be the same information 233 as that encoded in the restructured object 232. Lastly, the received object 245 includes information 246 which may be the same information 243 as that encoded in the restructured object 242.

The received object is then provided to the post-processing module (act 313) where processing branches depending on whether there is information encoded by the pre-processing module into the received object (decision block 314). If there is no information encoded by the pre-processing module in the received object ("No" in decision block 314), then this means that the original source object was already of a transport-compatible type (refer to "Yes" in decision block 302). Accordingly, the object may be passed directly to the target logic for processing (act 319). On the other hand, if the pre-processing module 215 does encode information into the received object ("Yes" in decision block 314), then the encoded information is extracted (or decoded) from the received object (act 315). For instance, in FIG. 2, both of the objects 235 and 245 have respective encoded information 236 and 246. Accordingly, the post-processing module 225 extracts that information from the received objects.

Processing then branches depending on whether the extracted information indicates that the source object is an actionable type (decision block 316). If the source type is an actionable type ("Yes" in decision block 316), the post-processing component records the identifier (act 317) associated with the source type (and received type). For example, in FIG. 2, the post-processing module 225 might store the identifier in the store 226.

The extracted source type information is then used to restructure the received object into a target object that corresponds to the source object (act 318). The target object is then provided to the target logic of the target frame (act 319) for processing (act 320). If an identifier is stored in the store 226, the identifier is stored in a manner so as to be associated with the target object provided to the target logic.

Several examples of a communication from a source frame to a target frame will now be described. In these examples, the transport type will be a string, which will be represented as a JSON string, the sending module 212 will be the JSON.stringify method, and the receiving module 222 will be the JSON.parse method.

Date Example

In a first example, a date object is sent from the source logic 211 to the target logic 212. For instance, suppose that the pre-processing component 215 receives an instruction (act 301) to send the following date object to the target frame 202:

As the JSON.parse method is not capable of converting a string back into such a date object ("No" in decision block 302), and since the date object has no methods to call against it or other actions that can be taken against it ("No" in decision block 303), the pre-processing component 215 restructures the date object to be one of the types that the JSON.parse method can convert into (act 306). For instance, the JSON.parse method can reformulate simple objects having a single key-value pair from the following string representation:

{"Key":"Value"}

The pre-processing component then forms an object having a key and a value. The key may be, for example, a source type identifier that identifies the type of the source object (e.g., "##special_date##"). The value might be, for example, a string representation of the date (e.g., "2013-01-01T08:00:00.000Z"). Thus, in this case, source type information is encoded (e.g., using "##special_date##") into the object (act 307), which is then provided to the JSON.stringify method (act 308).

The JSON.stringify method converts the object the same as any other similarly structured object that has a key and a value, and generates the following JSON string (act 309):

{"##special_date##":"2013-01-01T08:00:00.000Z"}

The string is then dispatched (act 310) to the target frame, whereupon it is received by the JSON.parse method (act 311). The JSON.parse method parses the object into the simple object that includes the key "##special_date##" and the value "2013-01-01T08:00:00.000Z" (act 312), whereupon the object is passed to the post-processing module 225 (act 313).

The post-processing module 225 recognizes from the double number sign "##" prefix and suffix on the key, and in response determines that the content of the key identifies a source type of the source object ("Yes" in decision block 314). The post-processing module extracts the source type identification of "special_date" (act 315), which it understands is not an actionable type ("No" in decision block 316). The post-processing module understands the schema (or a semantically similar schema) of the source type, and thus based on the identification, can reconstruct the date object "new Date(2013, 0, 1)" (or perhaps a date object semantically similar) using the string information from the value field (act 318). The object is then passed to the target logic 221 (act 319) wherein the object can be processed (act 320).

Function Example

In a second example, there are two parts. In the first part, the source frame communicates a function to the target frame. In the second part, the target frame communicates a general function call on that function back to the target frame. Accordingly, FIG. 3 will be walked through two times in this example, once for the function, and once for the function call.

First, a function object is sent from the source logic 211 to the target logic 221. For instance, suppose that the pre-processing component 215 receives an instruction (act 301) to send the following function object to the target frame 202:

function ( ) { }

As the JSON.parse method is not capable of converting a string back into such a function object ("No" in decision block 302), the pre-processing module 215 evaluates the function to determine it is one of a list of objects that are indeed actionable ("Yes" in decision block 303) since the target frame may later place a function call back to the function on the source frame. Accordingly, the pre-processing module 215 generates an identifier (e.g., a unique identifier such as "af23a9ec-cc07-4ba6-b4df-1f6913977674") for the function object (act 304). The pre-processing module 215 retains this identifier in a store 216 in a manner as to be associated with the function object (act 305).

The pre-processing component 215 then restructures the function object to be one of the types that the JSON.parse method can convert received data into (act 306). For instance, suppose the pre-processing component 215 again constructs a simple object having a key and a value. In this case, the pre-processing component 215 encodes the source type identifier (e.g., "##special_function##") as the key (act 307), and the unique identifier (e.g., "af23a9ec-cc07-4ba6-b4df-1f6913977674") as the value (also act 307). The resulting object is passed to the JSON.stringify method (act 308).

The JSON.stringify method converts the object the same as any other similarly structured object that has a key and a value, and generates the following JSON string (act 309):

{"## special_function##": "af23a9ec-cc07-4ba6-b4df-1f6913977674"}

The string is then dispatched (act 310) to the target frame, whereupon it is received by the JSON.parse method (act 311). The JSON.parse method parses the object into the simple object that includes the key "##special_function##" and the value "af23a9ec-cc07-4ba6-b4df-1f6913977674" (act 312), whereupon the object is passed to the post-processing module 225 (act 313).

The post-processing module 225 recognizes from the double number sign "##" prefix and suffix on the key, that the content of the key identifies a source type of the source object ("Yes" in decision block 314). Accordingly, the post-processing module 225 extracts the source type identification of "special_function" (act 315), which it understands is an actionable type ("Yes" in decision block 316). The post-processing module 225 understands based on this type identification that the value field of the object is the unique identifier for the source object (and the received object). The post-processing module 225 thus retains the unique identifier in the store 226 (act 307) in a manner that is associated with the target object that is provided to the target logic. The post-processing module then formulates a target object (act 318) for which the post-processing module would recognize the corresponding function call. For instance, the post-processing unit might simply provide the function "function ( ) { }" to the target logic (act 319). The return path will begin when the target logic calls the target object (act 320).

In the return path, the role of the source frame and the target frame are reversed. Thus, for the remainder of the function example, the source frame 201 will be understood to have received the target object "function ( ) { }" in response to having been sent a function by the target frame. Thus, the source frame (which would be the target frame 202 in the switched role) also has a receiving module 222 and a post processing module 225, whereas the target frame (which would be the source frame 201 in the switched role) also has pre-processing module 215 and a sending module 212.

When the source logic 211 calls the function previously provided by the target logic 221, the source logic 211 issues a function call object (act 301 in the second iteration of method 300 in this function example). For instance, the source logic 211 might issue the function call "func( )". As the JSON.parse method is not capable of converting a string back into such a function call object ("No" in decision block 302), and since the function call object has no further methods to call against it or other actions that can be taken against it ("No" in decision block 303), the pre-processing component 215 restructures the function call object to be one of the types that the JSON.parse method can convert into (act 306). For instance, the pre-processing component then forms an object have a key and a value.

The pre-processing module 215 recognizes the function call as having corresponded to a target object that has a particular identifier within the store 216. Thus, the pre-processing module 215 encodes the function identifier within the restructured object (act 307). For example, the key may be a source type identifier that identifies the type of the source object (e.g., "##call_junction##"). The value might be, for example, a string representation of the function identifier (recall this was "af23a9ec-cc07-4ba6-b4df-1f6913977674"). The resulting object is then provided to the JSON.stringify method (act 308).

The JSON.stringify method converts the object the same as any other similarly structured object that has a key and a value, and generates the following JSON string (act 309):

{"## call_function ##":"af23a9ec-cc07-4ba6-b4df-1f6913977674"}

The string is then dispatched (act 310) to the target frame, whereupon it is received by the JSON.parse method (act 311). The JSON.parse method parses the object into the simple object that includes the key "##call_function ##" and the value "af23a9ec-cc07-4ba6-b4df-1f6913977674" (act 312), whereupon the object is passed to the post-processing module 225 (act 313).

The post-processing module 225 recognizes, from the double number sign "##" prefix and suffix on the key, that the content of the key identifies a source type of the source object ("Yes" in decision block 314). The post-processing module extracts the source type identification of "call_function" (act 315), which it understands is not an actionable type ("No" in decision block 316). The post-processing module understands the schema (or a semantically similar schema) of the source type, and thus based on the identification, understands that the unique identifier provided in the value field will identify the method being called. The post-processing module 224 then checks the store and finds that the function ( ) { } is being called. The post-processing unit then formulates the proper function call that will be recognized by the target logic (act 318), provides the function call to the target logic (act 319), whereupon the target logic treats the function call the same as if it called the function ( ) { } from internal to the target logic (act 320).

Function Call to Named Method

As a third example, again there are two parts. In the first part, the source frame communicates a function call to a specific named method that the target frame listens to. This may involve the communication of a set of one or more input arguments to the method. In the second part, the target frame communicates a function call return back to the source frame. This might be in the simple form of an acknowledgement message, but may also include a set of one or more return values.

First, a function call object is sent from the source logic 211 to the target logic 221. For instance, suppose that the pre-processing component 215 receives an indication (act 301) that a function call has been made to a method called "someMethod" with two input parameters as follows:

var method=sender.getMethod("someMethod");
method(123, "hello");

As the JSON.parse method is not capable of converting a string back into such a function call object ("No" in decision block 302), the pre-processing module 215 evaluates the function to determine it is one of a list of objects that are indeed actionable ("Yes" in decision block 303). Accordingly, the pre-processing module 215 generates an identifier (e.g., a unique identifier or a "handle" such as "f1b78c53-e4e4-432b-a2cd-89532187d497") for the function call object (act 304). The pre-processing module 215 retains this identifier in a store 216 in a manner as to be associated with the function call object (act 305).

The pre-processing component 215 then restructures the function call object to be one of the types that the JSON.parse method can convert into (act 306). For instance, the JSON.parse method can generate a simple object having multiple key-value pairs separated by a comma as follows:

{"Key1":"Value1", "Key2":"Value2" . . . "KeyN": "ValueN"} where N is any positive integer 2 or greater.

In this case, the pre-processing component 215 generates a simple object having three key-value pairs. The first key includes the name "method" and the corresponding value includes the name of the method being called (in this case "someMethod"). The second key includes the name "args" and the corresponding value includes an array listing all of the input arguments in order (e.g., in the case of 123 and "hello" being input arguments, the value would be [123,"hello"]. The third key includes the name "handle" and the corresponding value includes the unique identifier of the function call (in this case ""f1b78c53-e4e4-432b-a2cd-89532187d497"). Thus, the source type information as well as the unique identifier for the source object, and the input arguments, are all encoded within the object (act 307). The resulting object is passed to the JSON.stringify method (act 308).

The JSON.stringify method converts the object the same as any other similarly structured object that has three key-value pairs, and generates the following JSON string (act 309):

```
{
    "method":"someMethod",
    "args":[123,"hello"],
    "handle":"f1b78c53-e4e4-432b-a2cd-89532187d497"
}
```

The string is then dispatched (act 310) to the target frame, whereupon it is received by the JSON.parse method (act 311). The JSON.parse method parses the object into the simple object that includes the three key-value pairs. The resulting object is then passed to the post-processing module 225 (act 313).

The post-processing module 225 recognizes this format (in accordance with a pre-determined contract set up with the pre-processing module 215) as an encoded function call to a method ("Yes" in decision block 314). The post-processing module extracts the encoded information (act 315) including the name of the method "someMethod" being called, the input arguments being 123 and "handle" in that order, and the unique identifier "f1b78c53-e4e4-432b-a2cd-89532187d497" of the function call.

The post-processing module 225 further understand the function call to the identified method as being an actionable type ("Yes" in decision block 316), and thus retains the unique identifier in the store 226 (act 307) in a manner that is associated with the function call that is to be provided to the target logic. The post-processing module then formulates the target object (act 318) in the form of a function call. The function call is then provided to the target logic (act 319) whereupon the function call to the named method is executed using the input arguments (act 320).

The target logic might have been listening to the method "someMethod" using the following code:

```
receiver.addMethod("someMethod", function(arg1, arg2) {
    // Execute some code
    return "something";
});
```

In the return path, the role of the source frame and the target frame are reversed. Thus, for the remainder of the function call example, the source frame 201 will be understood to have executed the method called "someMethod", with the target frame 202 having placed the call to the method.

In the return path, when the source logic 211 performs the function call, a function call return object is generated and provided to the pre-processing module 215 (act 301). For instance, the object might include output arguments in the form of a status (e.g., "done") and a return value (e.g., "something").

As the JSON.parse method is not capable of converting a string back into such a function call return object ("No" in decision block 302), and since the function call return object has no further methods to call against it or other actions that can be taken against it ("No" in decision block 303), the pre-processing component 215 restructures the function call return object to be one of the types that the JSON.parse method can convert into (act 306). For instance, the pre-processing component then forms an object have a two key-value pairs.

The pre-processing module 215 recognizes the function call as having corresponded to a function call object that has a particular identifier within the store 216. Thus, the pre-processing module 215 encodes as the first key the name "method" and as the corresponding value encodes the unique identifier "f1b78c53-e4e4-432b-a2cd-89532187d497". For the second key, the pre-processing module 215 encodes the name "args" and the corresponding value as an array of two output arguments ""[{"status":"done","value":"\"something\""}]. The resulting object is then provided to the JSON.stringify method (act 308).

The JSON.stringify method converts the object the same as any other similarly structured object that has two key-value pairs, and generates the following JSON string (act 309):

```
{
    "method":"f1b78c53-e4e4-432b-a2cd-89532187d497",
    "args":[{"status":"done","value":"\"something\""}]
}
```

The string is then dispatched (act 310) to the target frame, whereupon it is received by the JSON.parse method (act 311). The JSON.parse method parses the object that includes the two key-value pairs (act 312), whereupon the object is passed to the post-processing module 225 (act 313).

The post-processing module 225 recognizes this as being in accordance with the pre-defined contract with the pre-processing module 215, and thus understand there to be encoded content ("Yes" in decision block 314). The post-processing module extracts the encoded content including the unique identifier and the output arguments (act 315). The function call return is not an actionable type ("No" in decision block 316). The post-processing module 225 identifies the function call using the unique identifier encoded in the function call return, and the unique identifier for the original function call stored in the store 226.

The post-processing unit then formulates the proper function call return that will be recognized by the target logic (act 318), provides the function call return to the target logic (act 319), whereupon the target logic treats the function call return the same as if it made the function call to a method that was internal to the target logic (act 320).

More Complex Example

A more complex example is essentially a repeat of the third example involving a function call on a particular method, followed by a function call return from that method. However, instead of the input arguments being 123 and "hello", the input arguments are instead the date object "new Date(2013, 0, 1)" of the first example, and the function object "function ( ) { }" of the second example.

The pre-processing module 215 would perform the same as described above for the third example when processing the function call to the method called "someMethod". However, processing of the input arguments would be somewhat different. Here, each input argument is not of a transport-compatible type that the receiving module could convert received data it. Accordingly, the pre-processing module formulates each object into a transport-compatible format (e.g., as a simple object).

For instance, the date object new Date(2013, 0, 1) might be formulated into a first simple object having one key-value pair with the key being "##special_date##" and the value being "2013-01-01T08:00:00.000Z", just as in the first example above. This object would be a child object to the overall object constructed by the pre-processing module 215. Specifically, the child value would be the first value in an array the forms the value of the second name-value pair (in which the "key" has the name "args").

The function object "function ( ) { }" might be formulated also include a second simple object having one key-value pair with the key being "##special_function##" and with the value being "af23a9ec-cc07-4ba6-b4df-1f6913977674", just as in the second example above. This object would be a child object to the overall object constructed by the pre-processing module 215. Specifically, the child value would be the second value in an array the forms the value of the second name-value pair (in which the "key" has the name "args").

The JSON.stringify method would generate the following JSON string:

```
{
    "method":"someMethod",
    "args":[{"##special_date##":"2013-01-01T08:00:00.000Z"},
        {"##special_function##":"af23a9ec-cc07-4ba6-b4df-
        1f6913977674"}],
    "handle":"f1b78c53-e4e4-432b-a2cd-89532187d497"
}
```

After post-processing, the target frame would receive a function call in which the input arguments are two objects, the first being the date object "new Date(2013, 0, 1)" and the second being the function ( ) { }.

The target frame might respond by calling the function (the second argument), and cause the following JSON string to be transmitted back to the source frame:

```
{
    "method":" af23a9ec-cc07-4ba6-b4df-1f6913977674",
    "args":["any arguments"],
    "handle":"9dd45cee-3b29-4fff-858b-91357bc9ad42"
}
```

Note that the method is identified as being the function communicated as the second argument. The handle is the new unique identifier assigned to the return function call.

The source frame might then provide a return on the function call as follows:

```
{
    "method":"9dd45cee-3b29-4fff-858b-91357bc9ad42",
    "args":[{"status":"done"}]
}
```

Note that the handle of the new function call is returned along with the status of done, indicating to the caller that the function has completed.

Accordingly, the principles described herein provide for inter-frame communication of complex types including functions, function calls, function call returns, and so forth. As a call is placed, the function call is returned allowing for asynchronous messaging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for communicating an object between frames of a web browser window, the method comprising:
    at a source frame within a browser window, identifying a source object of a first object type is to be sent from the source frame over an inter-frame communication channel to a target frame within the browser window, wherein the source frame is configured to convert the source object to a transport-compatible type that is used by the inter-frame communication channel prior to sending the source object over the inter-frame communication channel;
    at the source frame, identifying that the target frame is incapable of converting data of the transport-compatible type into objects of the first object type; and
    at the source frame, and based at least on identifying that the target frame is incapable of converting data of the transport type into objects of the first object type:
        identifying a second object type that the target frame is capable of converting data of the transport type into;
        restructuring the source object to be a restructured object of the second object type, wherein the restructured object includes encoded source type information that correlates to the first object type;
        converting the restructured object from the second object type to a transport-compatible object of the transport-compatible type; and
        sending the transport-compatible object over the inter-frame communication channel to the target frame,
        wherein, based on the source frame having sent the transport-compatible object over the inter-frame communication channel to the target frame, the target frame is configured to convert the transport-compatible object into an object of the second object type that preserves the encoded source type information, and to use the encoded source type information to restructure the object of the second object type into a target object of the first type that corresponds to the source object.

2. The method in accordance with claim 1, wherein the transport-compatible type is a string type.

3. The method in accordance with claim 1, wherein the source object is an element of another object.

4. The method in accordance with claim 1, wherein the first object type comprises a date.

5. The method in accordance with claim 1, wherein the first object type is an actionable type, such that a particular action can be taken on the source object.

6. The method in accordance with claim 5, wherein the first object type is a function.

7. The method in accordance with claim 5, further comprising the source frame uniquely identifying an identity of the source object, and at least temporarily storing the identity of the source object, wherein the restructured object includes the identity of the source object.

8. The method in accordance with claim 7, wherein the transport-compatible type is a first transport-compatible type, and the data of the transport-compatible type is first data of the first transport-compatible type, the method further comprising:
at the source frame, receiving second data of the first transport-compatible type from the target frame; and
at the source frame, converting the second data of the first transport-compatible type into an object of a second transport-compatible type, the object of the second transport-compatible type having encoded therein the identity of the source object as well as an identification of an action to be performed on the source object.

9. The method in accordance with claim 8, further comprising:
at the source frame, decoding the identity of the source object and the identification of the action from the object of the second transport-compatible type; and
in response to decoding the identity of the source object and the identification of the action, the source frame performing the identified action on the identified source object.

10. The method in accordance with claim 9, wherein the source object is a function, and the identified action is a function call.

11. The computer system in accordance with claim 1, wherein the transport-compatible type is a string type.

12. The computer system in accordance with claim 1, wherein the source object is an element of another object.

13. The computer system in accordance with claim 1, wherein the first object type comprises a date.

14. The computer system in accordance with claim 1, wherein the first object type is an actionable type, such that a particular action can be taken on the source object.

15. The computer system in accordance with claim 14, wherein the first object type is a function.

16. The computer system in accordance with claim 14, the computer-executable instructions also including instructions that are executable to configure the computer system to uniquely identify an identity of the source object, and to at least temporarily store the identity of the source object, wherein the restructured object includes the identity of the source object.

17. The computer system in accordance with claim 16, wherein the transport-compatible type is a first transport-compatible type, and the data of the transport-compatible type is first data of the first transport-compatible type, the computer-executable instructions also including instructions that are executable to configure the computer system to:
receive, at the source frame, second data of the first transport-compatible type from the target frame; and
convert, at the source frame, the second data of the first transport-compatible type into an object of a second transport-compatible type, the object of the second transport-compatible type having encoded therein the identity of the source object as well as an identification of an action to be performed on the source object.

18. The computer system in accordance with claim 17, the computer-executable instructions also including instructions that are executable to configure the computer system to:
decode, at the source frame, the identity of the source object and the identification of the action from the object of the second transport-compatible type; and
in response to decoding the identity of the source object and the identification of the action, perform the identified action on the identified source object at the source frame.

19. A computer system, comprising:
one or more processors; and
one or more computer-readable media having stored thereon computer-executable instructions that are executable by the one or more processors to configure the computer system to communicate an object between frames of a web browser window, the computer-executable instructions including instructions that are executable to configure the computer system to perform at least the following:
identify, at a source frame within a browser window, a source object of a first object type is to be sent from the source frame over an inter-frame communication channel to a target frame within the browser window, wherein the source frame is configured to convert the source object to a transport-compatible type that is used by the inter-frame communication channel prior to sending the source object over the inter-frame communication channel;
identify, at the source frame, that the target frame is incapable of converting data of the transport-compatible type into objects of the first object type; and
at the source frame, and based at least on identifying that the target frame is incapable of converting data of the transport type into objects of the first object type:
identify a second object type that the target frame is capable of converting data of the transport type into;
restructure the source object to be a restructured object of the second object type, wherein the restructured object includes encoded source type information that correlates to the first object type;
convert the restructured object from the second object type to a transport-compatible object of the transport-compatible type; and
send the transport-compatible object over the inter-frame communication channel to the target frame, wherein, based on the source frame having sent the transport-compatible object over the inter-frame communication channel to the target frame, the target frame is configured to convert the transport-compatible object into an object of the second object type that preserves the encoded source type information, and to use the encoded source type information to restructure the object of the second object type into a target object of the first type that corresponds to the source object.

20. A computer program product comprising one or more hardware storage devices having stored thereon computer-executable instructions that are executable by one or more processors of a computer system to configure the computer system to communicate an object between frames of a web browser window, the computer-executable instructions including instructions that are executable to configure the computer system to perform at least the following:
identify, at a source frame within a browser window, a source object of a first object type is to be sent from the source frame over an inter-frame communication channel to a target frame within the browser window, wherein the source frame is configured to convert the source object to a transport-compatible type that is used by the inter-frame communication channel prior to sending the source object over the inter-frame communication channel;

identify, at the source frame, that the target frame is incapable of converting data of the transport-compatible type into objects of the first object type; and at the source frame, and based at least on identifying that the target frame is incapable of converting data of the transport type into objects of the first object type:

identify a second object type that the target frame is capable of converting data of the transport type into;

restructure the source object to be a restructured object of the second object type, wherein the restructured object includes encoded source type information that correlates to the first object type;

convert the restructured object from the second object type to a transport-compatible object of the transport-compatible type; and send the transport-compatible object over the inter-frame communication channel to the target frame, wherein, based on the source frame having sent the transport-compatible object over the inter-frame communication channel to the target frame, the target frame is configured to convert the transport-compatible object into an object of the second object type that preserves the encoded source type information, and to use the encoded source type information to restructure the object of the second object type into a target object of the first type that corresponds to the source object.

* * * * *